United States Patent [19]

Swan

[11] 3,786,586

[45] Jan. 22, 1974

[54] METHOD AND ARTICLE FOR DETERMINING HOW MUCH LINE TO USE WHEN TROLLING

[75] Inventor: Edward J. Swan, Ontario, N.Y.

[73] Assignee: Majestic Lures, Ontario, N.Y.

[22] Filed: Jan. 11, 1973

[21] Appl. No.: 322,895

[52] U.S. Cl. .......... 43/4, 35/74

[51] Int. Cl. .......... A01k 97/00

[58] Field of Search .......... 43/4; 35/74

[56] References Cited

UNITED STATES PATENTS 2,532,061 11/1950 Glick .......... 35/74

3,365,818 1/1968 Greiner .......... 35/74

FOREIGN PATENTS OR APPLICATIONS 1,131,119 10/1968 Great Britain .......... 43/4

*Primary Examiner*—Louis G. Mancene

*Assistant Examiner*—Daniel J. Leach

*Attorney, Agent, or Firm*—John R. Schovee et al.

[57] ABSTRACT

The depth at which fish are located is first measured using, for example, a sonar depth finder. The line depth finder of this invention is a plastic plate in the form of a truncated right triangle which is held vertically with its horizontal reference line horizontal, and the slope of the fish line while trolling is compared to a plurality of differently sloped and marked lines on the line depth finder. After selecting the sloped line that most closely matches the actual slope of the fish line, reference is made to a depth chart located directly on the line depth finder. The depth chart plots "depth in feet" against the various sloped lines and gives the length of line required to position the hook at that depth while trolling. The line depth finder has the same information printed on both sides, and all of the sloped lines preferably emanate from a single index point.

15 Claims, 1 Drawing Figure

THERMO-CLINE CHART

COHO 52-57
L. M. BASS 70-75
S. M. BASS 65-70
MUSKIE 60-70
RAINBOW 60-70
WALLEYE 55-70
PERCH 55-70
BROWN TROUT 55-70
N. PIKE 50-70
PICKEREL 50-70
BROOK TROUT 55-65
LAKE TROUT 45-55

DEPTH CHART

| Depth in Feet | REQUIRED FEET OF LINE (APPROX.) | | | | | | |
|---|---|---|---|---|---|---|---|
| | A | B | C | D | E | F | G |
| 10 | 125 | 60 | 30 | 25 | 18 | 15 | 13 |
| 20 | 255 | 125 | 60 | 45 | 32 | 30 | 25 |
| 30 | 385 | 190 | 95 | 65 | 50 | 40 | 35 |
| 40 | 510 | 255 | 130 | 85 | 65 | 55 | 50 |
| 50 | | 315 | 160 | 110 | 80 | 70 | 60 |
| 60 | | 380 | 195 | 130 | 95 | 85 | 75 |
| 70 | | 445 | 225 | 150 | 110 | 100 | 90 |
| 80 | | 505 | 260 | 170 | 130 | 115 | 105 |
| 90 | | | 295 | 190 | 150 | 130 | 125 |
| 100 | | | 325 | 220 | 170 | 145 | 135 |
| 110 | | | 360 | 250 | 190 | 160 | 150 |
| 120 | | | 390 | 275 | 210 | 175 | 165 |

Majestic

DIRECTIONS WHILE TROLLING:
1. HOLD FINDER BOTTOM EDGE PARALLEL WITH WATER SURFACE.
2. SIGHT YOUR LINE TO INDEX PT. ARROW AT BOTTOM OF FISH FINDER.
3. KEEPING FINDER PARALLEL WITH WATER SURFACE, READ PATH OF FISH LINE TO PROPER LETTER.
4. REFER TO DEPTH CHART.

INDEX PT.

Majestic
LINE DEPTH FINDER
a must for trolling

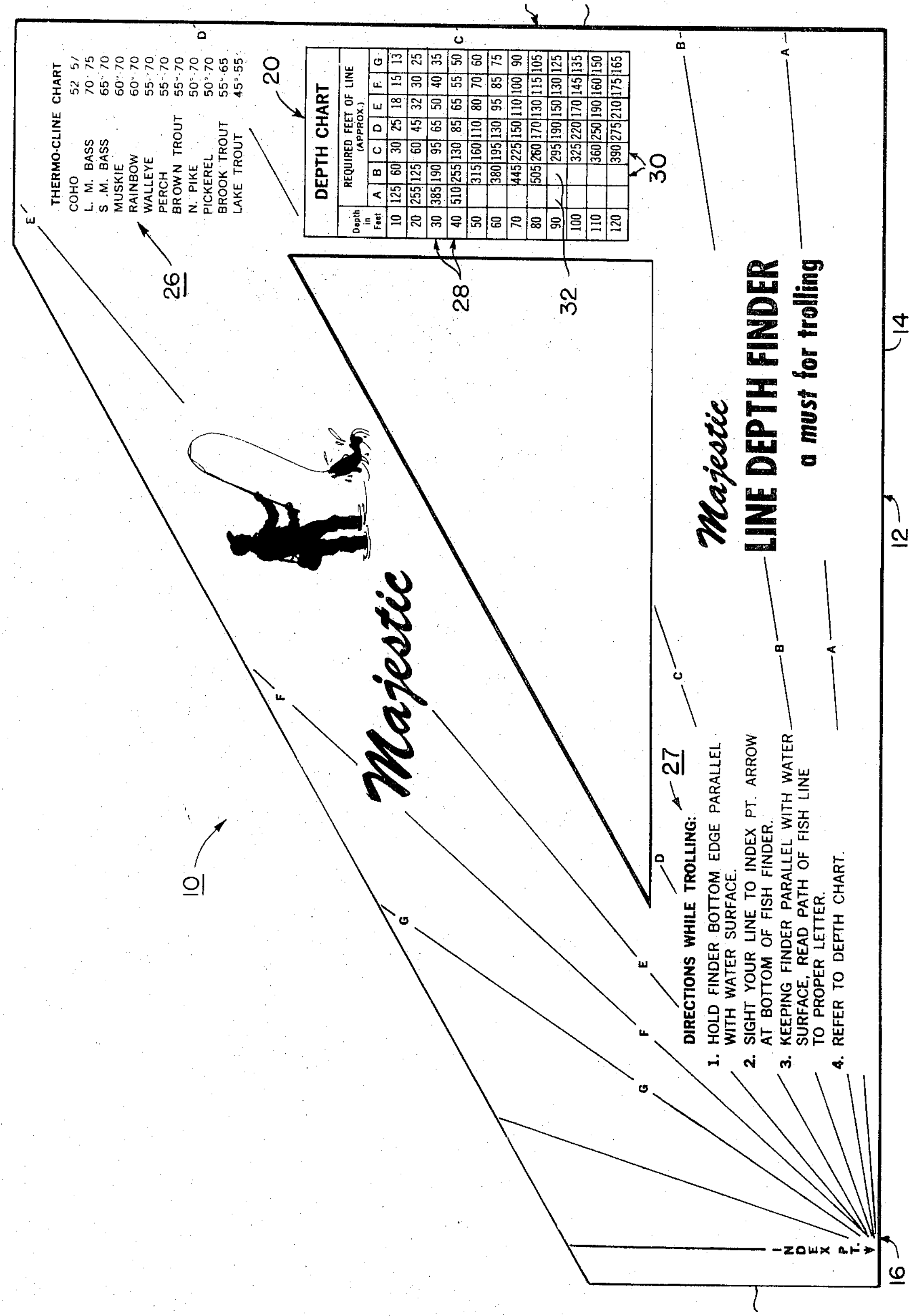
THERMO-CLINE CHART
COHO 52 57
L. M. BASS 70 75
S .M. BASS 65 70
MUSKIE 60 70
RAINBOW 60 70
WALLEYE 55 70
PERCH 55 70
BROWN TROUT 55 70
N. PIKE 50 70
PICKEREL 50 70
BROOK TROUT 55 65
LAKE TROUT 45 55
DEPTH CHART
Depth in Feet
REQUIRED FEET OF LINE (APPROX.)
A B C D E F. G
10 125 60 30 25 18 15 13
20 255 125 60 45 32 30 25
30 385 190 95 65 50 40 35
40 510 255 130 85 65 55 50
50 315 160 110 80 70 60
60 380 195 130 95 85 75
70 445 225 150 110 100 90
80 505 260 170 130 115 105
90 295 190 150 130 125
100 325 220 170 145 135
110 360 250 190 160 150
120 390 275 210 175 165
Majestic
Majestic
LINE DEPTH FINDER
a must for trolling
DIRECTIONS WHILE TROLLING:
1. HOLD FINDER BOTTOM EDGE PARALLEL WITH WATER SURFACE.
2. SIGHT YOUR LINE TO INDEX PT. ARROW AT BOTTOM OF FISH FINDER.
3. KEEPING FINDER PARALLEL WITH WATER SURFACE, READ PATH OF FISH LINE TO PROPER LETTER.
4. REFER TO DEPTH CHART.
INDEX PT.
A B C D E F G
10 12 14 16 18 20 22 24 26 27 28 30 32

METHOD AND ARTICLE FOR DETERMINING HOW MUCH LINE TO USE WHEN TROLLING

BACKGROUND OF THE INVENTION

1. Field of the Invention

This invention relates to fishing and in particular to determining the correct amount of line to use when trolling for fish at a specific depth.

2. Description of the Prior Art

Sonar depth finders for measuring the depth at which fish are located are well-known and are widely used. However, when trolling, more line must be used than that corresponding to the depth at which the fish are located, and the amount required varies with the speed of the boat. The amount of line used, prior to the present invention, was simply guessed at.

It is therefore an object of the present invention to overcome the disadvantages of the prior art and to provide an accurate method and article for determining how much line to use.

SUMMARY OF THE INVENTION

The line depth finder of the present invention comprises a flexible, plastic, truncated right triangle with identical information on both sides, so that it can conveniently be used from either side. Each side of the line depth finder contains a horizontal reference line (which is preferably the bottom edge of the plastic triangle), a plurality of lines of different slope, all emanating from a single index point, and a depth chart, plotting "depth in feet" at which the fish are located (in horizontal rows), against the differently sloped lines numbered, for example, "A" through "G" (in vertical columns). The chart contains a plurality of squares, each one corresponding to one pair of the variables, such as "60 feet in depth" and "line D," and sets forth the length of line needed to be let out to position the hook at that depth (i.e., 60 feet) and at that speed of the boat (and other conditions) that gives the line its slope (corresponding to line D).

BRIEF DESCRIPTION OF THE DRAWINGS

The present invention will be more fully understood by reference to the following detailed description thereof, when read in conjunction with the attached drawings, wherein like reference numerals refer to like elements, and wherein:

The FIGURE is a view of one surface of the line depth finder of the present invention.

DETAILED DESCRIPTION OF THE PREFERRED EMBODIMENTS

With reference now to the drawing, the FIGURE shows a line depth finder 10 made of a plate of flexible plastic and in the shape of a truncated right triangle. The line depth finder 10 includes a horizontal reference line 12 (preferably a bottom edge 14 of the plastic triangle), a plurality of lines A–G of different slope, (preferably all emanating from a single index point 16 adjacent the horizontal reference line 12 and adjacent a rear edge 18 of the line depth finder 10), and a depth chart 20 (preferably printed directly on the line depth finder 10). The line depth finder 10 can also include a vertical reference line 22 (such as a vertical front edge 24) that can be used with or alternatively to the horizontal reference line 12. The line depth finder 10 also preferably includes directions 27 and a thermo-cline chart 26 printed directly thereon along with the lines A–G and the depth chart 20.

The depth chart 20 includes a plurality of rows 28 corresponding to and labelled "depth in feet" and a plurality of columns 30 corresponding to and labelled with the sloping lines A–G. The chart 20 includes a plurality of squares 32 (this term is not be limited to "square" shape but is hereby defined to mean throughout the present specification and claims, the block or area defined by an intersecting row and column). A numeral is located in nearly every square 32 and gives the length of line (in feet) required to be let out to position the hook at the depth at which the fish are located when the speed of the boat (and other conditions) causes the line to have its particular slope.

In operation, the depth of the fish is first determined by use, for example, of a sonar depth finder. The line depth finder is then held in a vertical plane with the bottom edge 14 parallel with the water surface, and the slope of the fish line is compared to the lines A-G on the line depth finder 10. The line A–G that matches the closest to the slope of the fish line is determined and reference is then made to the depth chart 20 to find the amount of line to let out. For example, for 60 feet depth and a line of slope D, the chart provides the information that 130 feet of line must be let out.

The same information shown in the FIGURE is also contained on the other side of the line depth finder 10 for convenience of use, depending on which direction the operator is facing.

As stated above, the chart 20 takes into account the speed of the boat and other variables. Other variables include, for example, the speed and direction the water is moving, the wind, the weight of the line, hook, and bait, etc. In other words, the speed of the boat alone is not the only variable that determines the line slope nor the amount of line to let out. The numerals in the depth chart have been determined by experience. During use, the boat speed should be maintained constant. Any changes in the slope of the line should be followed by a re-use of the line depth finder 10.

The invention has been described in detail with particular reference to the preferred embodiment thereof, but it will be understood that variations and modifications can be effected within the spirit and scope of the invention as described hereinabove and as defined in the appended claims.

I Claim:

1. An article for determining how much fish line to let out when trolling comprising:

a. a line depth finder in the form of a plate adapted to be positioned in a vertical plane and having a side surface;

b. a plurality of sloped, straight lines on said surface, each of said lines being at a different angle to the horizontal;

c. a different indicium associated with each of said sloped lines for indentification thereof;

d. a horizontal reference line on said surface; and e. a depth chart on said surface of said line depth finder including a plurality of squares formed by a plurality of columns and a plurality of intersecting rows, one of said columns and rows being for said indicium, and the other of said columns and rows being a series of numerals indicating depth in feet, and a numeral located in most of said squares and being the length of line required for that depth of fish and for a fish line of that slope whereby the length of line required to be let out to locate the hook at the correct depth can be determined for any boat speed and any desired depth.

2. The article according to claim 1 wherein said line depth finder is flat and includes two side surfaces and wherein a separate set of said sloped lines, indicium, reference line, and chart are located on each of said side surfaces.

3. The article according to claim 1 including an index point and wherein all of said lines emanate from said index point.

4. The article according to claim 3 wherein said index point is adjacent a bottom edge and a rear edge of said line depth finder.

5. The article according to claim 1 wherein said line depth finder is made of plastic in the general shape of a truncated right triangle.

6. The article according to claim 1 wherein said horizontal reference line is a bottom edge of said line depth finder.

7. The article according to claim 6 wherein said line depth finder is flat and includes two side surfaces and wherein a separate set of said sloped lins, indicium, reference line, and chart are located on each of said side surfaces.

8. The article according to claim 7 including an index point and wherein all of said lines emanate from said index point.

9. The article according to claim 8 wherein said index point is adjacent a bottom edge and a rear edge of said line depth finder.

10. The article according to claim 9 wherein said line depth finder is made of plastic in the general shape of a truncated right triangle, with the right angle being adjacent a front edge of said triangle.

11. The article according to claim 10 wherein said series of numerals indicating depth in feet is in increments of 10 feet starting at 10 feet.

12. A method for retaining how much line to let out when trolling, comprising:

a. using a line depth finder adapted to be positioned in a vertical plane and having a side surface, a plurality of sloped, straight lines on said surface, each of said lines being at a different angle to the horizontal, a different indicium associated with each of said sloped lines for identification thereof, a horizontal reference line on said surface;
b. trolling a fishing line behind a moving boat,
c. placing said line depth finder in an approximately vertical plane with said horizontal reference line approximately horizontal;
d. comparing the slope of said fishing line with said lines on said line depth finder and selecting that line that most closely matches the slope of said fishing line;
e. referring to a chart plotting depth in feet against said sloped lines and selecting that square corresponding to the depth at which the fish are located and corresponding to said selected line; and
f. letting out that length of fish line equal to the numeral in said selected square.

13. The method according to claim 12 wherein said using step (a) includes providing said lines, indicium, and chart on both sides of said line depth finder, and providing an index point thereon from which all of said lines emanate.

14. The method according to claim 12 including the preliminary step of measuring the depth at which fish are located.

15. The method according to claim 12 including maintaining the speed of the boat approximately constant.

* * * * *